(12) United States Patent
Praus et al.

(10) Patent No.: US 11,240,042 B2
(45) Date of Patent: Feb. 1, 2022

(54) MERKLE SIGNATURE SCHEME TREE EXPANSION

(71) Applicant: Amazon Technologies, Inc., Seattle, WA (US)

(72) Inventors: Slavka Praus, Seattle, WA (US); Matthew John Campagna, Bainbridge Island, WA (US); Nicholas Alexander Allen, Kirkland, WA (US); Petr Praus, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/826,973

(22) Filed: Mar. 23, 2020

(65) Prior Publication Data

US 2020/0220735 A1    Jul. 9, 2020

Related U.S. Application Data

(62) Division of application No. 15/402,063, filed on Jan. 9, 2017, now Pat. No. 10,608,824.

(51) Int. Cl.
| | |
|---|---|
| *H04L 29/06* | (2006.01) |
| *H04L 9/32* | (2006.01) |
| *H04L 9/06* | (2006.01) |
| *H04L 9/08* | (2006.01) |

(Continued)

(52) U.S. Cl.
CPC .......... *H04L 9/3249* (2013.01); *H04L 9/0643* (2013.01); *H04L 9/083* (2013.01); *H04L 9/0861* (2013.01); *H04L 9/14* (2013.01); *H04L 9/3013* (2013.01); *H04L 9/3033* (2013.01)

(58) Field of Classification Search
CPC combination set(s) only.
See application file for complete search history.

(56) References Cited

U.S. PATENT DOCUMENTS

| | | |
|---|---|---|
| 9,705,730 B1 | 7/2017 | Petri et al. |
| 10,304,143 B2 | 5/2019 | Kasper et al. |
| 10,417,217 B2 | 9/2019 | Pierce et al. |

(Continued)

OTHER PUBLICATIONS

Dang, "Recommendation for Applications Using Approved Hash Algorithms" NIST Special Publication 800-107, Revision 1, National Institute of Standards and Technology (NIST), Aug. 2012, retrieved on Nov. 24, 2015, from http://csrc.nist.gov/publications/nistpubs/800-107-rev1/sp800-107-rev1.pdf, 25 pages.‡

(Continued)

*Primary Examiner* — Shin-Hon (Eric) Chen
(74) *Attorney, Agent, or Firm* — Davis Wright Tremaine LLP

(57) ABSTRACT

A first public key is generated based at least in part on a first plurality of signing keys and a second public key is generated based at least in part on a second plurality of signing keys. The signing keys may be used to generate digital signatures. The second public key may be made available to verify a digital signature generated using a signing key from the second plurality of signing keys. In some cases, a first Merkle tree may be formed by the first public key and the first plurality of signing keys, and a second Merkle tree may be formed by the second public key, the first public key, and the second plurality of signing keys.

20 Claims, 7 Drawing Sheets

(51) Int. Cl.
*H04L 9/14* (2006.01)
*H04L 9/30* (2006.01)

(56) References Cited

U.S. PATENT DOCUMENTS

| | | |
|---|---|---|
| 2012/0047284 A1 | 2/2012 | Tarkoma |
| 2012/0322413 A1* | 12/2012 | Haddad ................ H04L 63/08 455/411 |
| 2016/0098730 A1* | 4/2016 | Feeney .............. G06Q 20/3825 705/71 |
| 2016/0260091 A1 | 9/2016 | Tobias |
| 2016/0301531 A1 | 10/2016 | Finlow-Bates |
| 2016/0330034 A1 | 11/2016 | Back et al. |
| 2017/0031676 A1 | 2/2017 | Cechetti et al. |
| 2017/0126702 A1 | 5/2017 | Krishnamurthy |
| 2017/0132621 A1 | 5/2017 | Miller et al. |
| 2017/0163425 A1 | 6/2017 | Kaliski, Jr. |
| 2017/0244567 A1* | 8/2017 | Smeets ................ H04L 9/0894 |
| 2017/0318008 A1 | 11/2017 | Mead |
| 2017/0331803 A1 | 11/2017 | Parello et al. |
| 2018/0025167 A1 | 1/2018 | Bohli et al. |
| 2018/0039667 A1 | 2/2018 | Pierce et al. |
| 2018/0053182 A1 | 2/2018 | Mokhasi |
| 2018/0063139 A1 | 3/2018 | Day |
| 2018/0088928 A1 | 3/2018 | Smith et al. |
| 2018/0089465 A1 | 3/2018 | Winstrom et al. |
| 2018/0181756 A1* | 6/2018 | Campagna ............. G06F 21/64 |
| 2018/0183601 A1* | 6/2018 | Campagna .......... H04L 63/1441 |
| 2018/0183602 A1* | 6/2018 | Campagna ............ H04L 9/0861 |
| 2018/0183774 A1* | 6/2018 | Campagna ............ H04L 9/3247 |
| 2018/0189312 A1 | 7/2018 | Alas |
| 2019/0108350 A1 | 4/2019 | Bohli et al. |
| 2019/0251648 A1 | 8/2019 | Liu et al. |

OTHER PUBLICATIONS

Biryukov et al.,"Egalitarian Computing," 25th USENIX Security Symposium, Aug. 10-12, 2016, pp. 315-326.‡

Coelho, "An (Almost) Constant-Effort Solution-Verification Proof-of-Work Protocol based on Merkle Trees (extended and colored version of [7])," 1st International Conference on Progress in Cryptology, Jun. 2008, 8 pages.‡

Biryukov et al., "Equihash: Asymmetric Proof-of-Work Based on the Generalized Birthday Problem," Cryptology ePrint Archive Report 2015/946, 16 pages.‡

Dang, "Recommendation for Applications Using Approved Hash Algorithms," National Institute of Standards and Technology (NIST) Special Publication 800-107 Revision 1, Aug. 2010, retrieved Nov. 24, 2015, http://csrc.nist.gov/publications/nistpubs/800-107-rev1/sp800-107-rev1.pdf, 25 pages.

Biryukov, Alex et al., "Equihash: Asymmetric Proof-of-Work Based on the Generalized Birthday Problem", Cryptology ePrint Archive, Report 2015/946, pp. 1-16. (Year: 2015).

Buchmann et al., "XMSS—A Practical Forward Secure Signature Scheme based on Minimal Security Assumptions," Cryptography and Computeralgebra Department of Computer Science, Second Version, Nov. 26, 2011, 22 pages.

Wong, "Hash-Based Signatures Part IV: XMSS and SPHINCS," Cryptography Services NCC Group, retrieved Sep. 10, 2021, 6 pages.

\* cited by examiner
‡ imported from a related application

MERKLE SIGNATURE SCHEME TREE EXPANSION

CROSS-REFERENCE TO RELATED APPLICATIONS

This application is a divisional of U.S. patent application Ser. No. 15/402,063, now U.S. Pat. No. 10,608,824, filed Jan. 9, 2017, entitled "MERKLE SIGNATURE SCHEME TREE EXPANSION," the disclosure of which is hereby incorporated herein in its entirety.

BACKGROUND

In computer systems, digital signatures may be used to verify the authenticity of a message or document. Valid digital signatures provide recipients with assurances as to the authenticity and integrity of the message. Digital signatures are employed in a variety of applications, such as in the use of digital communications between multiple parties, as well as in storage and backup systems. Hash based signature schemes such as Merkle signature schemes may be used to generate and verify digital signatures. While the use of Merkle signature scheme to generate digital signatures has several advantages, there are also known drawbacks. For example, each signing key of a Merkle tree is typically allowed to be used to sign one message to preserve security properties of the scheme. After all signing keys have been used, the public keys of the Merkle tree are retained to make verification of the digital signatures possible. Over time, it is challenging for a computer system to manage storage and maintenance needs as the number of public keys that the system retains grows.

BRIEF DESCRIPTION OF THE DRAWINGS

Various techniques will be described with reference to the drawings, in which.

DETAILED DESCRIPTION

Figure 1:
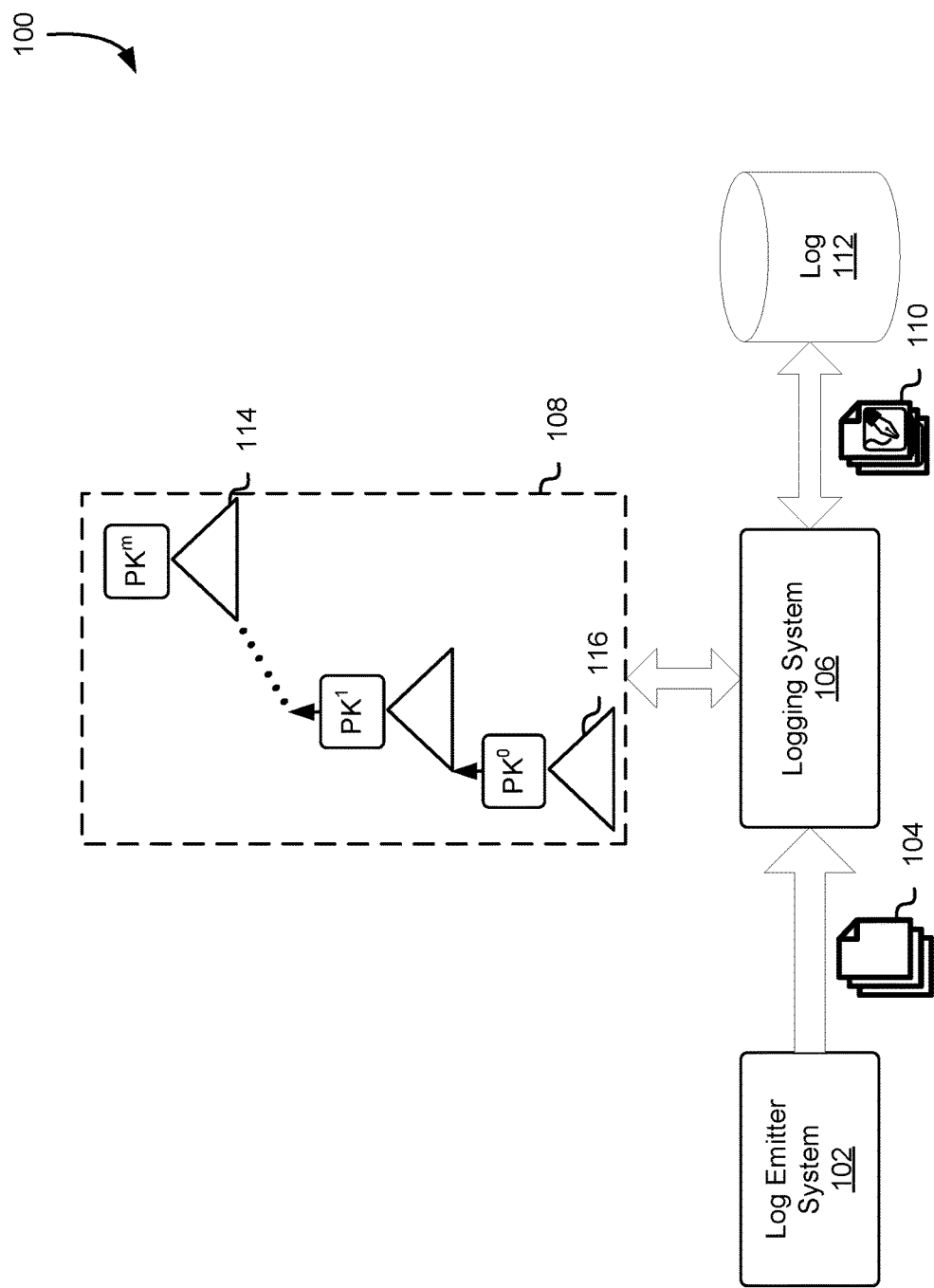
FIG. 1 shows an illustrative example of an environment in which various embodiments may be practiced.

This document describes techniques for expanding Merkle signature scheme tree expansion. Systems described in this document may be used to generate Merkle trees with expanded signature and verification capabilities, generate digital signatures, and verify digital signatures. The expanded Merkle trees may be adapted to various applications, such as data logging systems and data backup systems. The generated digital signature may be used (e.g., at a later point in time when a backup file is retrieved) to verify the authenticity and integrity of the logs or backups. Digital signatures may be generated using one-time signature key pairs that that may be key pairs generated in accordance with a Lamport-Diffie One-Time Signature (LD-OTS) scheme or a Winternitz One-Time Signature (W-OTS) scheme.

A traditional Merkle tree may be expanded, for example, where each signing key of the Merkle tree has been used to sign a message. Consider the case of a traditional Merkle tree having a public key $PK^{m-1}$. To generate an expanded Merkle tree, a set of key pairs comprising a private signing key $sk_i$ and a public signing key $pk_i$ may be generated. As an example, in the case of daily backups, a Merkle tree may be generated for each month having $2^5=32$ leaf nodes. The first (i.e., leftmost) leaf node may be the public key for the previous month's Merkle tree $PK^{m-1}$ and the remaining leaf nodes may be the corresponding public keys $pk_i$ for i=1 to 31. The key pairs generated may, for example, be one-time signature key pairs that that may be key pairs generated in accordance with a LD-OTS scheme or a W-OTS scheme.

The system may generate a Merkle tree using the key pairs and the public key as leaf nodes. Adjacent leaf nodes may be hashed together such that the values of two consecutive leaf nodes $H_{0,0}$ and $H_{0,1}$ are concatenated and the concatenation hashed $H_{1,0}=H(H_{0,0}, H_{0,1})$ to generate a parent node of the leaf nodes, and the process repeated for all leaf node pairs $H_{1,0}=H(H_{0,0}, H_{0,1})$ and so on. The outputs $H_{1,j}$ may then be concatenated and the concatenations hashed together in the same manner to generate a root node value that is the public key $PK^m$ of a new Merkle tree.

The system may also generate a signature pre-fix value $SIG^{m-1}$ for the current hash tree (i.e., the hash tree having a root node $PK^{m-1}$) that includes one or more hash values that may be used to verify an authentication path from the public key $PK^{m-1}$) to the root of the generated Merkle tree $PK^m$. At a minimum, exactly one node at each depth of the Merkle tree from $PK^{m-1}$ to $PK^m$ is needed to complete the authentication path. However, in other embodiments, other information may be stored. For example, in some embodiments, the signature pre-fix value may include the entire current hash tree. The system may use the signature pre-fix value to verify digital signatures.

The system may generate digital signatures using the expanded Merkle tree. A signing key pair $\{sk_j, pk_j\}$ may be selected to generate a digital signature. In many cases, the private signing key $sk_j$ has not previously been used to sign another message. The key pair may be a one-time signature key pair such as a key pair in accordance with LD-OTS scheme or W-OTS scheme. The private signing key may be used to sign a provided message m to generate a digital signature $sig_j$ generated by the signing process over the message m. The system may then obtain the hash values of nodes forming an authentication path from the public signing $pk_j$ to the root node $PK^m$. In some embodiments, additional information may be obtained that may be used to determine how the authentication path should be verified. For example, the additional information may include information regarding the position of the public key $pk_j$, information regarding the position of the respective nodes included in the authentication path, or both. The additional information may be used, for example, to determine the order in which values should be concatenated and/or combined to verify the authentication path. For example, the information may be used to determine whether a verification process should generate a hash $H(pk_j, H_{0,t_j})$ or $H(H_{0,t_j}, pk_j)$ as part of verifying the authentication path. The additional information may, for example, include the position of the public signing key $pk_j$ in the Merkle tree. Finally, the system may make available as a signature SIG: the signature $sig_j$;

the public key $pk_j$; the collected nodes $\{H_{i,t_j}\}$ that may be used to verify an authentication path from the public signing key $pk_j$ to the root node of the hash tree $PK_m$; the position information of the leaf node $pk_j$; and the hash tree identifier m.

The system may verify digital signatures of the expanded Merkle tree using the public key $PK^m$, including digital signatures generated by the sub-tree root nodes $PK^0$, $PK^1, \ldots, PK^{m-1}$. A system performing the signature verification process may have access to an authentic public key $PK^m$ that may be obtained from a digital certificate issued by a trusted entity. The authentic public key $PK^m$ may be the single point of trust for the expanded hash tree. Additionally, the system may have access to signature pre-fix values $\{SIG^u\}$ for one or more sub-trees under the current hash tree in cases where m>1. In the case where m=0, signature pre-fix values may not exist.

A request to verify a digital signature may include a signature SIG, a message m, and an authentic public key $PK^m$. The signature SIG may be parsed to obtain: $sig_j$; $pk_j$; collected nodes $\{H_{i,t_j}\}$ forming the authentication path; tree position index j; and a hash tree identifier u. The system may, after successfully parsing the signature SIG, generate a public key $PK^u$ for the Merkle tree index using the provided public signing key $pk_j$, the collected nodes $\{H_{i,t_j}\}$ forming the authentication path, and the tree position index j. The index j may be used to determine how to generate the authentication path hashes. As an example, the index may be used to determine whether to calculate the hash $H(pk_j, H_{0,t_j})$ or $H(H_{0,t_j}, pk_j)$ as part of verifying the authentication path. Hash outputs may be computed for the collected nodes in a nested manner. The output of the hash functions may refer to $PK^u$ which may have previously been the root node of the Merkle tree, but the tree has expanded such that u<m and $PK^m$ is now the root node of the Merkle tree. The system will determine whether the hash tree index u of the provided signature refers to the current tree—that is, if u equals m, then the verification may be performed by verifying the generated value $PK^u$ with the authentic public key $PK^m$.

However, in cases where the tree identifier u does not match the current tree, the generated hash value $PK^u$ may be hashed with the signature pre-fix value for the next hash tree $SIG^u$. The hashes may be iteratively generating hashes, concatenating $PK^u$ and the first hash of $SIG^u$ $H_{0,1}$ and generating a hash over the concatenation. The output of the hash is then concatenated with the next hash of $H_{1,1}$ of the signature pre-fix value $SIG^u$ and a second hash is generated over the second concatenation. The process is iteratively performed to generate a hash value $PK^{u+1}$. If u+1<m, then the process may be repeated where the hash value $PK^{u+1}$ may be hashed with the signature pre-fix value for the next hash tree $SIG^{u+1}$ until the final hash value $PK'^m$ is generated. In this way, an authentication path may be generated from $PK^u$ to $PK^m$. Upon generating the final value $PK'^m$, the system may verify the generated hash value $PK'^m$ matches the value of the authentic public key $PK^m$. If the values match, then the provided signature SIG over the message m may be verified as being authentic.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which various embodiments can be implemented. The computing environment 100 illustrates a data logging system that utilizes an expanded Merkle signature scheme tree expansion. For purposes of clarity, the logging system described below will be assumed to generate logs on a daily periodic schedule, but other applications in which Merkle trees may be used may also use the techniques described in this document for Merkle tree expansions.

A log emitter system 102 may be a computer component or subsystem that obtains and provides data to be logged over time. The log emitter system 102 may be implemented using software, hardware, or a combination of both, and may be used for a variety of purposes. The log emitter system 102 may be used to collect, format, and store data into log files which may be stored in a backend storage system on a periodic basis. The data 104 collected by a log emitter system may be any type of data, such as information related to login attempts to a system, data that a user specifies should be backed up periodically, collected data regarding metrics or use, and more. As a specific example the log emitter system 102 may be used to generate daily database backups where the state of a database system (e.g., user data, metadata, and settings) is collected, compressed, and archived into a backup file. In some cases, the daily backup may include multiple files.

The logging system 106 shown in FIG. 1 may be a computer component or subsystem that receives collected log data. The logging system 106 may be software, hardware, or a combination of both. The logging system may receive logging data 104 and generate digital signatures over the logging data received. The logging system 106 may generate a digital signature over the backup file. The digital signature may be used (e.g., at a later point in time when a backup file is retrieved) to verify the authenticity and integrity of data. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. The logging system may use an expanded Merkle tree 108 to generate and verify the digital signatures. A public key $PK^m$ of the Merkle tree 108 may be used to verify messages with signatures generated for the current Merkle tree 114 as well as for previous Merkle trees such as the first Merkle tree 116.

A one-time hash-based signature scheme may refer to a scheme for generating digital signatures wherein each signing key may be used to securely sign one message. In some embodiments, a one-time hash-based signature scheme may be used to sign multiple messages, but the signing of multiple signatures may result in additional properties of the signature scheme being made available such that adversaries may have additional knowledge that may be used as part of a cryptographic attack. In some cases, the additional knowledge may make an attack marginally more likely to be successful, but may still be considered infeasible or intractable. A one-time hash-based signature scheme may be a type of digital signature scheme. A digital signature scheme may refer to a scheme or method for generating digital signatures. Examples of one-time hash-based signature schemes include Lamport-Diffie One-Time Signature Scheme (LD-OTS) or Winternitz Winternitz One-Time Signature (W-OTS) scheme. Digital signatures may be generated using one-time signature key pairs that that may be key pairs generated in accordance with various digital signature schemes such as a LD-OTS scheme or a W-OTS scheme.

The logging system 106 may select an unused signing key of the Merkle tree and generate a digital signature over the message and include, as part of the signature SIG: the public signing key $pk_j$, the signature $sig_j$ generated over the daily backup or a portion thereof; a collection of Merkle tree nodes $\{H_{i,t_i}\}$ that may be used to verify an authentication path from the public signing key $pk_j$ to the root node of the hash tree $PK^m$; the position of the signing key $pk_j$ in the Merkle tree; and a hash tree identifier m for the current public key of the Merkle tree. Techniques for generating the signature are described below in more detail, for example, in connection with FIGS. 3-6.

The size of the Merkle tree may be configured based on the intended use. Continuing with the example of daily backups, the logging system 106 may receive, once a day, one or more log files from the log emitter system 102 as part of a request to perform a daily backup. At the start of a month, the logging system may generate a Merkle tree having 32 leaf nodes, where the first (i.e., leftmost) leaf node is the public key of the previous sub-tree and the remaining 31 leaf nodes may be used as signing keys for the respective days of the calendar month associated with the current Merkle tree. As there are at most 31 days in a calendar month, a Merkle tree having depth r=5 may be used to sign an entire month of daily backups. For example, if the current month is December, $PK^m$ may be associated with December and its Merkle tree may include as its leftmost node the root node for the month of November $PK^{m-1}$ (not shown in FIG. 1). These sub-trees may be iteratively chained together month after month.

The logging system 106 may store the daily backups and digital signatures 110 in a backend storage system (log) 112, which may, for example, be a local hard disk drive, a storage-area network, archival storage system, and the like. In some embodiments, a distributed storage system may be used such that the storage of the backup data and/or digital signatures may be within different storage devices of a distributed storage system. In other words, the backup data and digital signatures may be stored separately. The backend storage system 112 may be used to store digital signatures generated using the current public key $PK^m$, as well as digital signatures that were previously generated using $PK^0$, $PK^1$, ..., $PK^{m-1}$.

In some embodiments, the logging system 106 is used to verify digital signatures. The digital signatures that the logging system 106 verifies may, for example, be provided by clients of the backend storage system 106. In an embodiment, a client that obtains backup data may, prior to using the backup data, issue a request to the backend storage system to verify the digital signature of the backup data. By receiving a verification of the digital signature, the client may receive assurances as to the authenticity and integrity of the backup data that it obtained. In some embodiments, separate components, modules, or subsystems of a service are used to generate and verify digital signatures.

The logging system 106 may verify digital signatures. A logging system 106 may receive a signature SIG including: the public signing key $pk_j$, the signature $sig_j$ generated over a message m; a collection of Merkle tree nodes $\{H_{i,t_i}\}$ that may be used to verify an authentication path from the public signing key $pk_j$ to the root node of a Merkle tree $PK^u$; the position of the signing key $pk_j$ in the Merkle tree; and a hash tree identifier u of the Merkle tree used to sign the message. Note that in this case, the signature SIG may have been generated using Merkle tree $PK^0$, $PK^1$, ..., $PK^m$. The current public key $PK^m$ may be used to verify signatures generated in sub-trees such as $PK^0$, $PK^1$, ..., $PK^{m-1}$ as well as the current tree $PK^m$.

Upon receiving the signature SIG and the message m, the logging system 106 may obtain the public key $PK^m$ from a trusted source. In some embodiments, the public key $PK^m$ may be obtained from a digital certificate issued by a trusted certificate authority. In other embodiments, the public key $PK^m$ may be stored in a service that performs signature verification operations, for example, stored in a cryptographic module suitable for storing cryptographic keys such as a hardware security module (HSM) or trusted platform module (TPM). It should be noted that the public key $PK^m$ may be the single point of trust for the entire Merkle tree, such that all signing keys that were used as part of the sub-trees $PK^0$, $PK^1$, ..., and $PK^{m-1}$ may also be verified using the public key $PK^m$. The verification may be performed by: obtaining the signature SIG; verifying the signature $sig_j$ over the message m using the public signing key $pk_j$; verifying an authorization path from $pk_j$ to $PK^u$; and verifying an authorization path from $PK^u$ to $PK^m$ using one or more signature pre-fix values. Processes for the generation of signature pre-fix values and verification of digital signatures are described in more detail in connection with FIGS. 2-6.

Figure 2:
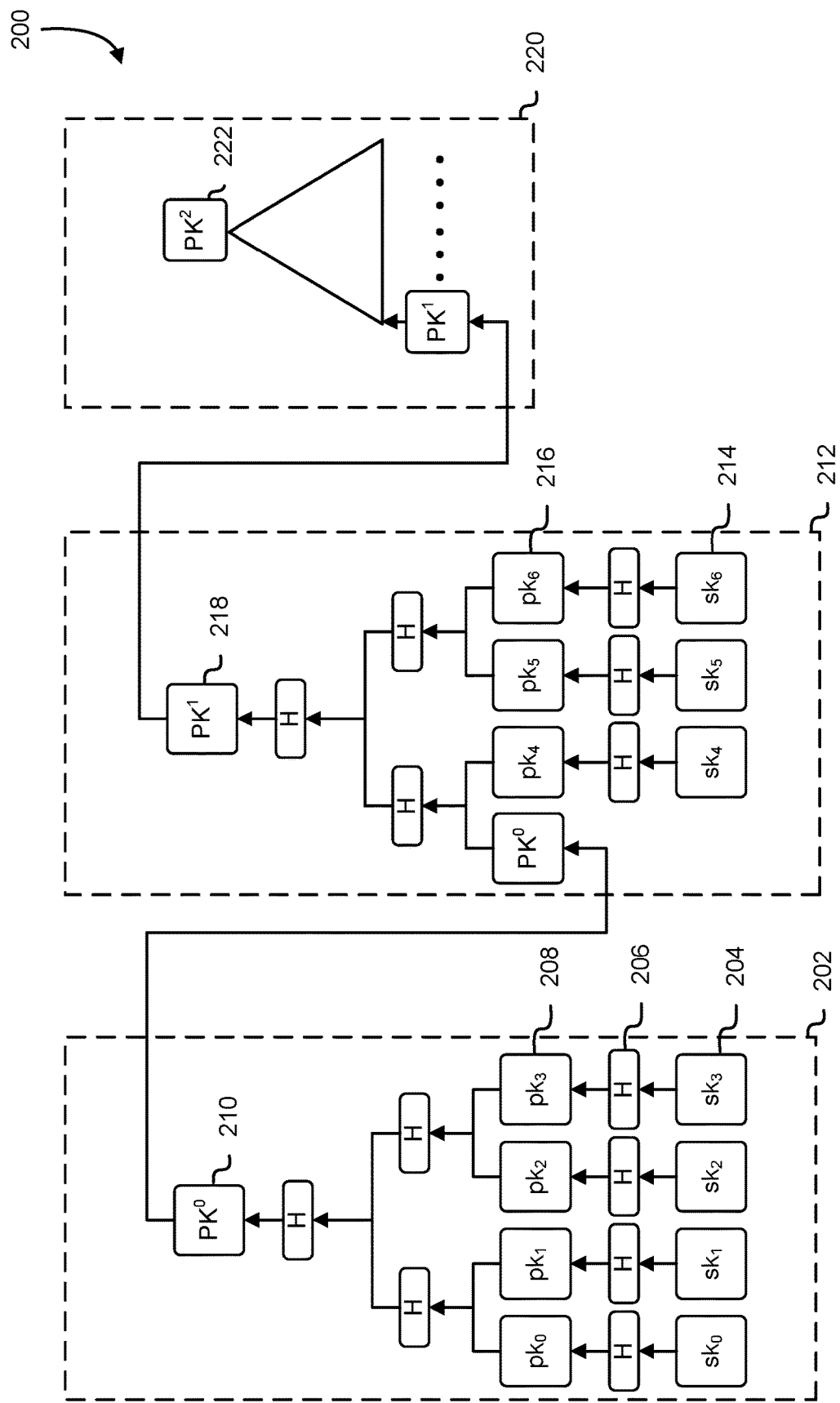
FIG. 2 shows an illustrative example of a hash tree having expanded signing capabilities.

FIG. 2 illustrates a diagram 200 of a hash tree having expanded signing capabilities. The hash trees may be Merkle trees that may be used to generate digital signatures in accordance with a Merkle signature scheme. Consider the diagram 200 shown in FIG. 2, which shows a first Merkle tree having a first public key $PK^0$. The first Merkle tree 202 having a public key $PK^0$ may have been generated using any method for generating Merkle trees, which may include Merkle trees generated using any one-time signature key pairs including key pairs in accordance with LD-OTS and W-OTS. In some embodiments, a computer system may generate the first Merkle tree 202 by generating n secret key values 204. The secret key values, shown in FIG. 2 as $sk_i$, may be random or pseudo-random numbers that are generated, for example, by a pseudo-random number generator (PRNG). Typically, the number of secret values generated for a Merkle tree is a power of two, but it is not required that the number of secret values be a power of two. Each secret key $sk_i$ may be used to generate a public key 208 $pk_i$. The pair $\{sk_i, pk_i\}$ may be referred to as a key pair. A system may use a hash function to generate the public keys. A secret value $sk_i$ may be an input to a hash function and the public key $pk_i$ may be the output. A cryptographic hash function or pseudo-random function may be used to generate the public key.

Generally speaking, a cryptographic hash function may generally refer to a function that deterministically maps a domain of inputs to a range of outputs in a manner that appears truly random. Thus, given the output of a cryptographic hash function, it should be no more likely that any value in the domain of inputs was more likely to have generated the output than another value in the domain. Additionally, because a cryptographic hash function deterministically maps a domain of inputs to a range of outputs, the same input will generate the same output.

In some embodiments, a secret key $sk_i$ may be an input to a cryptographic hash function 206 and the generated output may be the corresponding public key $pk_i$. Pairs of public keys may be hashed together, and the hashed output of those pairs may again be hashed together to generate a binary tree where the public key of the Merkle tree is the root node 210. As an example, the value of the public key $PK^0$ 210 shown in FIG. 2 may be generated as: $H(H(pk_0, pk_1), H(pk_2, pk_3))$—that is, the first and second public keys are hashed together (e.g., the keys are concatenated together and the concatenation is hashed) to generate a first sub-hash and the third and fourth public keys are hashed together to generate a second sub-hash, and the two sub-hashes are hashed together to generate the result. The public key of a Merkle tree may be denoted as $PK^m$ (capitalized letters and superscripted index), which may be distinguished from the public key corresponding to a signing key $sk_i$ which is denoted as $pk_i$ (lowercase letters and subscripted index).

It should be noted that while the example described above and elsewhere in this document generates a node from the concatenation of one or more other nodes, that the one or more other nodes may, more generally, be combined in any manner. As an example, a parent node may be calculated by interleaving the child nodes (e.g., the even bit positions of the calculated value are selected from the first child node and the odd bit positions of the calculated value are selected from the second child node) and hashing the interleave sequence value. More generally the node may be generated over a logical or bitwise manipulation of the one or more other nodes. As yet another example, a parent node may be generated by performing a bitwise operation over one or more child nodes (e.g., by calculating a bitwise exclusive disjunction (e.g., XOR) of the child nodes) and generating a hash over the result of the operation.

Each key pair of a Merkle tree may be used to securely sign a message only once. As an example, the first Merkle tree 202 shown in FIG. 2 may be used to sign four messages. After all the key pairs of the first Merkle tree 202 are exhausted (e.g., after all key pairs $sk_0 \ldots sk_3$ have been used to sign messages), a system such as the system described in accordance with FIG. 1 above may need to digitally sign more messages. In such a case, the system may expand the tree. The system may generate a second Merkle tree 212. As with the first Merkle tree, a set of secret keys 214 may be generated for the second tree and each secret key $sk_i$ may be used to generate corresponding a public key 216 (e.g., with the use of a cryptographic hash function). However, instead of generating a key pair for the leftmost node of the Merkle tree, the public key $PK^0$ 210 of the first Merkle tree is instead used as a leaf node. Thus, for the second Merkle tree 212 shown in FIG. 2, the public key pairs 216 and $PK^0$ are hashed together to generate the root node 218 for the second Merkle tree 212. For the example embodiment shown in FIG. 2, generation of the public key $PK^1$ 218 may include hashing $PK^0$ and $pk_4$, hashing $pk_5$ and $pk_6$, and then hashing the results of the two hash outputs together to generate the root note 218 of the second Merkle tree 212—in other words, $PK^1=H(H(PK^0, pk_4), H(pk_5, pk_6))$. The secret keys 214 may be used to sign additional messages, and digital signatures signed by those secret keys 214 may be verified in the same manner or similar manner as described above using the root node $PK^1$.

It should be noted that the system does not necessarily need to expand the Merkle tree in response to detecting that all the key pairs have been exhausted. The Merkle tree may, instead, be expanded at any point, even in cases where the first tree has only used some or none of its keys to sign messages, such as after a threshold number of key pairs have been exhausted. As an example, consider the case where the first Merkle tree having public key $PK^0$ has signed three messages, and the last key pair $\{sk_3, pk_3\}$ is still available to sign messages. If the tree is expanded, such as in the manner described above, such that the root of the tree is $PK^1$, then $sk_3$ may still be used to sign messages. The message may be signed using $sk_3$ to generate a signature $sig_3$ and the following information may be provided to form a verifiable signature SIG containing: $sig_3$, the index position of $pk_3$, the public signing key pk3, the hash values for all intermediate nodes from $pk_3$ to the root $PK^0$, and the index corresponding to the Merkle tree having the root $PK^0$. With the provided information, the system may verify the signature SIG using techniques described, such as the verification process described below in connection with FIG. 6.

Additionally, tree expansions may be chained together. As shown in FIG. 2, a third Merkle tree 220 may be generated (e.g., when all of the previous signing keys 204 and 214 have been exhausted) by using the private key $PK^1$ of the second hash tree as a leaf node of the Merkle tree that may be used as part of generating the root node $PK^2$ 222 of the third hash tree 220. The triangle shown in FIG. 2 may be used to describe, generally, a Merkle tree having a root node $PK^2$ 222 and at least one leaf node that is a root node $PK^1$ 218 of a sub-tree.

Note that when describing the second hash tree 212, the first hash tree 202 may be viewed as being encapsulated in the second hash tree 212 by virtue of the root node 210 of the first hash tree 202 being included as a leaf node of the second hash tree 212.

As noted above, while the description of FIG. 2 above describes the trees shown in FIG. 2 as Merkle trees, the trees may, more generally, be any suitable hash tree. Additionally, the hash trees described in connection with FIG. 2 are both described with the same tree-depth and same number of leaf nodes purely for illustrative purposes—the trees may have variable tree-depths and/or number of leaf nodes. Additionally, a binary tree is illustrated in FIG. 2 for clarity, but a ternary tree may be used instead or in combination with a binary tree. More generally, any k-ary tree (i.e., a tree structure wherein each node has at most k child nodes) may be used in place of or in combination with other tree structures.

Note that in various embodiments such as those described in FIG. 2, a Merkle tree may refer to a completed Merkle tree such as the first Merkle tree 202 or the second Merkle tree 212 without sub-trees. However, a Merkle tree may also refer to a Merkle tree that includes sub-trees. For example, a Merkle tree may also refer to a tree that includes both the second Merkle tree 212 and a sub-tree (e.g., the first Merkle tree 202).

Figure 3:
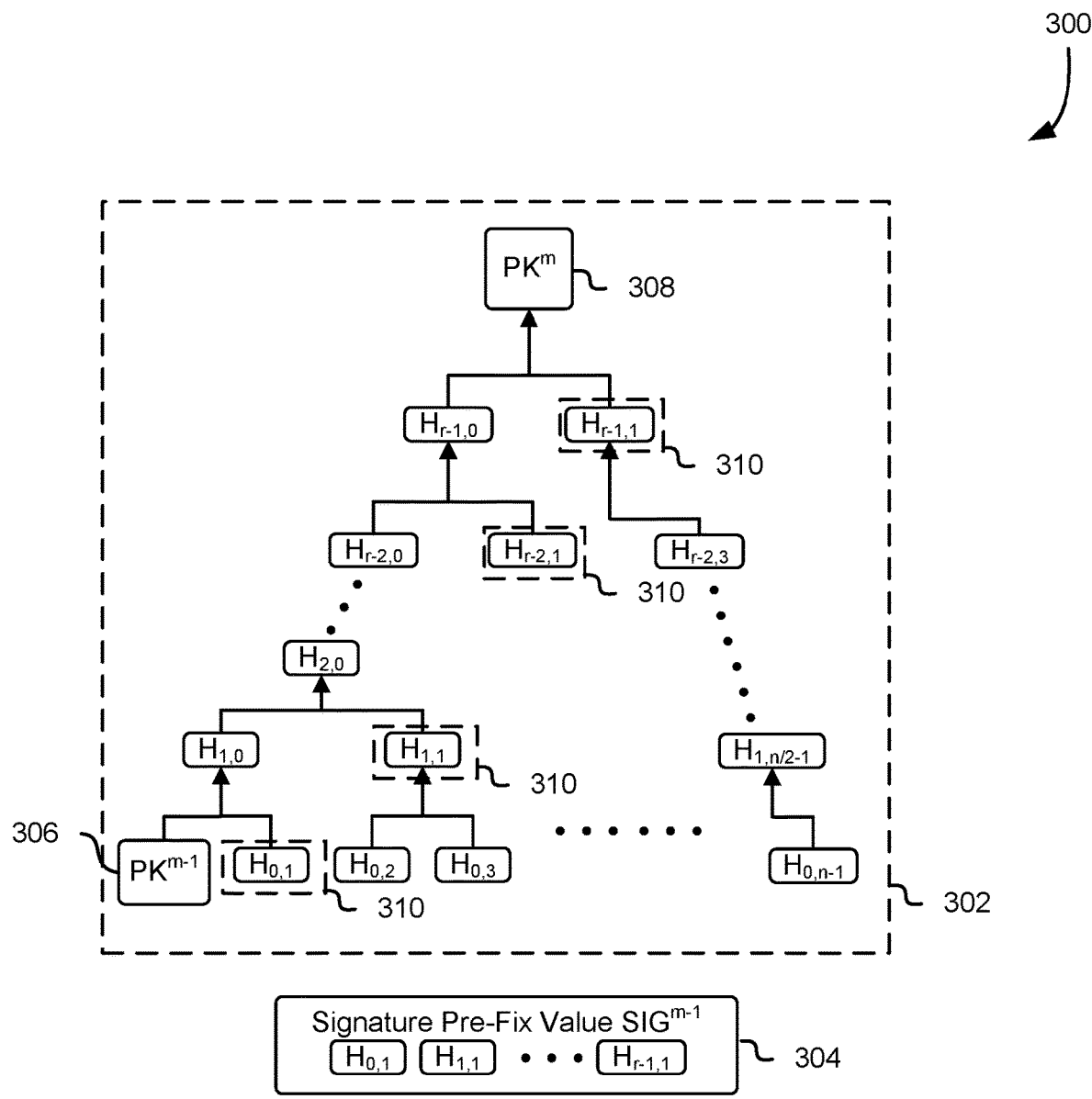
FIG. 3 shows an illustrative example of a hash tree having expanded signing capabilities.

FIG. 3 illustrates a diagram 300 of a hash tree 302 having expanded signing capabilities. The hash trees may be Merkle trees that may be used to generate digital signatures in accordance with a Merkle signature scheme and may be implemented in accordance with embodiments described above in connection with FIGS. 1-2. FIG. 3 additionally shows a signature pre-fix value 304 that may be used to verify digital signatures that were signed by predecessor key pairs such as key pairs that may have been previously generated as part of generating a previous root node $PK^{m-1}$ 306.

The Merkle tree 302 shown in FIG. 3 has a first leaf node corresponding to the root node of a previous tree $PK^{m-1}$ 306, and several hash values $H_{j,i}$ where j refers to the height of the node and i refers to an index of the node at a particular height. As an example, in FIG. 2, $pk_0$ would be referred to as $H_{0,0}$, $pk_1$ as $H_{0,1}$, and the hash of $pk_0$ and $pk_1$ as $H_{1,0}=H(pk_0, pk_1)$.

Returning to FIG. 3, the leaf nodes $H_{0,i}$ shown in FIG. 3 may be public keys that were generated as part of a key generation process to compute the root node $PK^m$ and $H_{1,i}$ the hash of a pair of leaf nodes—for example, $H_{1,0}=H(PK^{m-}$ 1, $H_{0,1}$). The signature pre-fix value $SIG^{m-1}$ 304 may include all intermediate nodes of the Merkle tree that connect with $PK^{m-1}$ to reach the root node 308. Some of the intermediate nodes 310 that connect with $PK^{m-1}$ to reach the root node 308 are shown in FIG. 3, while others (e.g., as denoted by ellipses) have been omitted for clarity. For example, when $PK^{m-1}$ is the left-most leaf node, the signature pre-fix value 304 contains $H_{j,1}$ for j=0 to r-1 where r is the height of the Merkle tree. In other embodiments, the position of the previous root node 306 may be positioned as a different leaf node. For example, if the $PK^{m-1}$ were positioned as the rightmost node, the signature pre-fix value $SIG^{m-1}$ would include $H_{0,n-2}$, $H_{1,n/2-2}$, ..., $H_{r-1,0}$. The signature pre-fix value 304 may be used in conjunction with the current root node $PK^m$ 308 to verify an authentication path between $PK^{m-1}$ and $PK^m$. In other words, the authentication path may be used in conjunction with $PK^{m-1}$ to derive $PK^m$. Given the previous root node $PK^{m-1}$ 306, the system may verify chain of trust from $PK^{m-1}$ to $PK^m$ by successively hashing $PK^{m-1}$ with the nodes included in signature pre-fix value $SIG^{m-1}$. For example, in FIG. 3, the previous root node $PK^{m-1}$ 306 may be iteratively hashed with the signature pre-fix values to calculate the root node value: that is, the result of $H( \ldots, H(H(PK^{m-1}, H_{0,1}), H_{1,1}) \ldots )$ should equal $PK^m$.

The signature pre-fix value 304 may be used as part of a signature verification process. FIG. 3 illustrates a Merkle tree having a root node $PK^m$ 308 and subtrees $PK^{m-1}$, $PK^{m-2}$, ..., $PK^0$. The signature verification for key pairs generated for the current tree $PK^m$ may be performed by: selecting a private key $sk_j$ that has not yet been used to sign any messages; obtaining (e.g., using a hash function) the corresponding public key $pk_j$ and a signature $sig_j$ over a message m; collecting nodes $\{H_{i,t_j}\}$ for j=0 ... r-1 to complete the Merkle tree from $pk_j$ to $PK^m$; and providing a signature SIG for the message that includes $sig_j$, the index j corresponding to the signing key, $pk_j$, and an authentication path including nodes $\{H_{i,t_j}\}$ that may be used to complete the Merkle tree from $pk_j$ to $PK^m$. Verification of a provided signature SIG may performed by: verifying $sig_j$ over message m using $pk_j$; hashing $pk_j$ with the collected nodes $\{H_{i,t_j}\}$ to complete the Merkle tree to generate an expected root node value; and verifying that the generated root node value matches the public key $PK^m$. The collected nodes $\{H_{i,t_j}\}$ may be used to verify an authentication path between the public signing key $pk_j$ and the root node $PK^m$ by successively hashing $pk_j$ with the collected nodes $\{H_{i,t_j}\}$.

The signature verification for key pairs generated for a previous tree $PK^u$ where u<m may be performed by: selecting a private key $sk_j$ that has not yet been used to sign any messages; obtaining (e.g., using a hash function) the corresponding public key $pk_j$ and a signature $sig_j$ over a message m; collecting nodes $\{H_{i,t_j}\}$ for j=0 ... r-1 to complete the Merkle tree from $pk_j$ to $PK^u$; and providing a signature SIG for the message that includes $sig_j$, the index j corresponding to the signing key, $pk_j$, the authentication path including nodes $\{H_{i,t_j}\}$ that may be used to complete the Merkle tree from $pk_j$ to $PK^u$, and the index u that identifies the previous tree. Verification of a provided signature SIG may performed by: verifying $sig_j$ over message m using $pk_j$; hashing $pk_j$ with the collected nodes $\{H_{i,t_j}\}$ to complete the Merkle tree to generate an expected root node value; verifying that the generated root node value matches $PK^u$; using the signature pre-fix value $SIG^u$ to complete the Merkle tree from $PK^u$ to $PK^{u+1}$; completing the Merkle tree from $PK^{u+1}$ to $PK^m$ using the signature pre-fix values $SIG^{u+1}, \ldots SIG^m$; and verifying that the generated root node value matches the public key $PK^m$. Thus, the public key $PK^m$ may be stored as a single point of trust for key pairs generated for a previous tree having a previous root node $PK^u$ as well as key pairs generated for the current tree.

In the examples above, hashing $pk_j$ with the collected nodes $\{H_{i,t_j}\}$ may include using the index position of the signing key to determine how the hashing occurs—for example, the order in which $pk_j$ and $\{H_{i,t_j}\}$ should be concatenated as part of completing the tree to generate a root node value. In some embodiments, the public key $PK^m$ may be obtained from a digital certificate issued by a trusted certificate authority. In other embodiments, the public key $PK^m$ may be stored in a service that performs signature verification operations, for example, stored in a cryptographic module suitable for storing cryptographic keys such as a HSM or TPM device. The system may also store signature pre-fix values $SIG^0, \ldots, SIG^{m-1}$ in the same manner as the public key $PK^m$, or differently. In some embodiments, the public key $PK^m$ may be stored in a cryptographic module, whereas the signature pre-fix values are stored in a network storage device. It should be noted that while the signature pre-fix values may be stored using conventional storage media, if a signature pre-fix value is modified (e.g., by a malicious party), that such modifications may result in authentic signatures being identified as not authentic, but will not result in forged signatures being identified as authentic signatures if the public key $PK^m$ is authentic.

Figure 4:
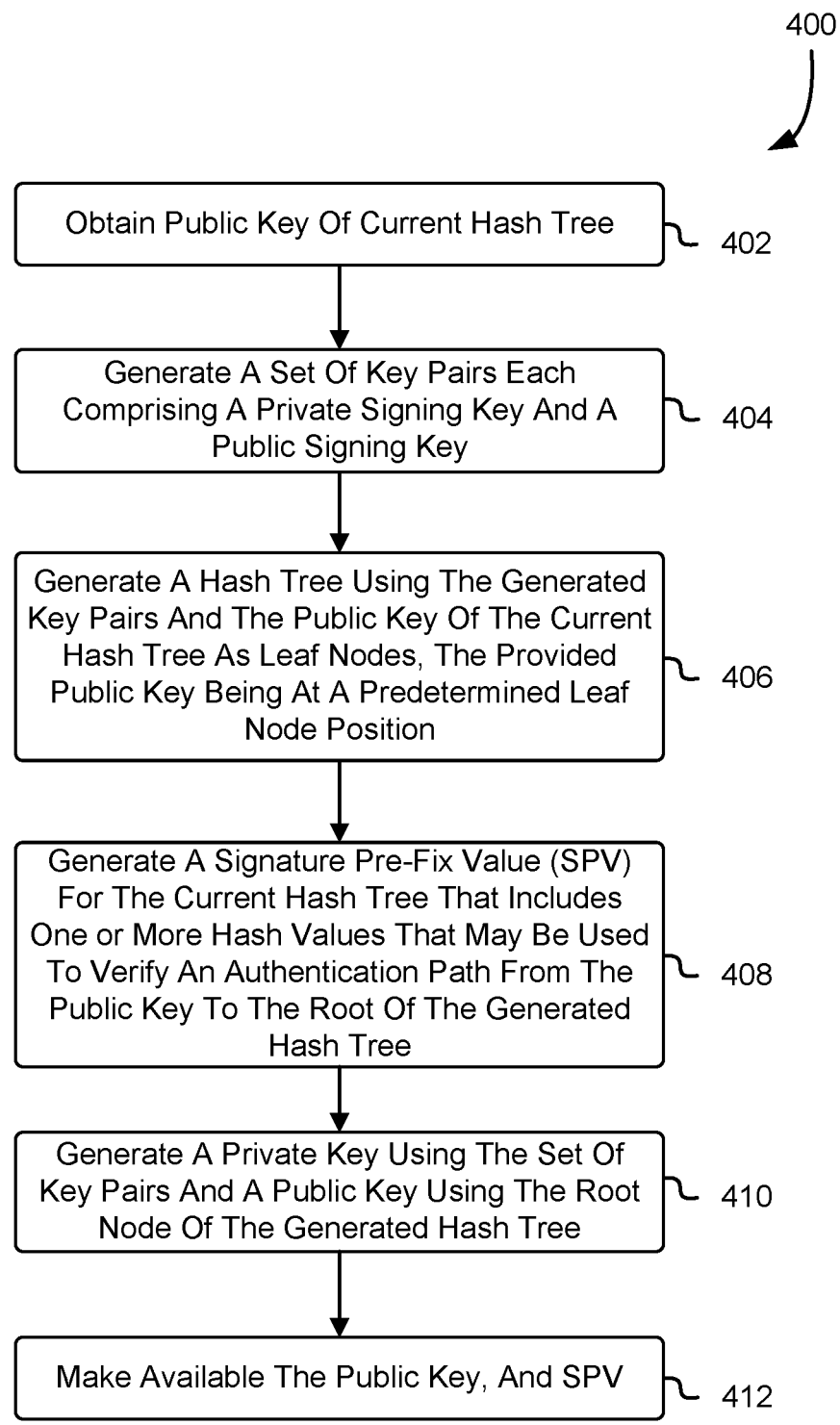
FIG. 4 shows a diagram illustrating a key generation process that expands the signing capabilities of a hash tree.

FIG. 4 shows an illustrative example of a process 400 for expanding the signing capability of a hash tree. Generally, the process 400 may be performed by any suitable computing environment such as environments described above in connection with FIGS. 1-3. The process may be performed as part of a process that is invoked by an entity, for example via an application programming interface (API) or may be performed automatically by a system, for example, either in response to detecting that a Merkle tree has been exhausted as a result of all of its private signing keys having been used to sign messages. A second example where the process may be performed is based on a periodic schedule. For example, for a system which generates daily backups and digitally signs each daily backup, a system may, for example, on the first or last day of the month, generate a Merkle tree of size $2^5$=32 leaf nodes wherein each day of a month has an associated signing key pair. Of course, the schedule may be performed on other days of the month or at different frequencies in accordance to various periodic schedules. Likewise, a system may generate a Merkle tree of size $2^3$=8 leaf nodes once a week for storing daily backups.

The system may obtain 402 the public key of a current hash tree. Hash trees described in connection with FIG. 4 may, for example, be Merkle trees. The current hash tree may be a Merkle tree which has already used all associated private signing keys to sign messages. For the purposes of describing the process 400 of FIG. 4, the public key of the current hash tree may be referred to as the public key $PK^{m-1}$, for example, corresponding to a particular month of the year (e.g., m-1 refers to June, m refers to July, and so on). In some embodiments, the system may obtain a set of public keys for two or more hash trees.

In some embodiments, a set of key pairs may be generated 404. The key pairs may comprise a private signing key and a public signing key. In some embodiments, a system may, to generate a Merkle tree having $2^r$ child nodes, generate $2^r-1$ key pairs, the remaining leaf node being filled by the public key that may be obtained 402 before, after, or concurrently with the generation of the key pairs. As an example, in the case of daily backups, a Merkle tree may be generated for each month having $2^5=32$ leaf nodes. As each month has at most 31 days, the system may generate $2^5-1=31$ key pairs and each day of the month may have a corresponding key pair that may be used to sign the daily backup for that day of the month. One leaf node position (e.g., the first or leftmost leaf node) may be the public key for the previous month's Merkle tree. The key pairs generated may, for example, be one-time signature key pairs that may be key pairs generated in accordance with a LD-OTS scheme or a W-OTS scheme.

After generating a set of key pairs and obtaining at least one public key of an existing hash tree, the system may generate 406 a hash tree using the key pairs and the public key as leaf nodes. The hash tree may, as discussed above, be a Merkle tree. Adjacent leaf nodes may be hashed together such that the values of two consecutive leaf nodes $H_{0,0}$ and $H_{0,1}$ are concatenated and the concatenation hashed $H_{1,0}=H(H_{0,0}, H_{0,1})$, and the process repeated for all leaf node pairs $H_{1,0}=H(H_{0,0}, H_{0,1})$ and so on. The outputs $H_{ij}$ may then be concatenated and the concatenations hashed together in the same manner to generate a root node value that is the public key $PK^m$ of a new Merkle tree. As noted above, parent nodes may be generated by combined child nodes using various techniques (e.g., concatenating, interleaving). In some embodiments, the provided public key $PK^{m-1}$ may be the leftmost mode, but more generally, may be at any predetermined leaf node position (e.g., the leftmost position, second-to-the-left position, . . . , the rightmost position). Furthermore, in some embodiments (not shown in FIG. 4), more than one public key may be included as part of the hash tree. For example, for a Merkle tree with 32 leaf nodes being generated for daily backups in the month of November, the leftmost node may be the public key for the hash tree associated with the preceding September and the second node to the left may be the public key for the hash tree associated with the preceding October (i.e., the previous month), and the generating 30 key pairs, each key pair being a leaf node to the Merkle tree of November and the set of the days of November forming a one-to-one function (i.e., injective relationship) with the key pairs. In some relationships the mapping between the days of the month and the key pairs may more specifically form a one-to-one correspondence (i.e., bijective relationship). The hashing may be performed using a cryptographic hash function or pseudo-random function that deterministically generates a range of outputs from a domain of inputs.

After or as part of generating the Merkle tree the system may generate 408 a signature pre-fix value $SIG^{m-1}$ for the current hash tree (i.e., the hash tree having a root node $PK^{m-1}$) that includes one or more hash values that may be used to verify an authentication path from the public key $PK^{m-1}$ to the root of the generated hash tree $PK^m$. As an example, consider an embodiment in accordance with the hash tree shown above in FIG. 3. The one or more hash values that may be used to complete an authentication path from $PK^{m-1}$ to $PK^m$ may include $H_{i,1}$ for i=0 to r−1. Note that in this case, exactly one node at each depth of the Merkle tree between $PK^{m-1}$ to $PK^m$ is needed to complete the Merkle tree. However, in other embodiments, other information may be stored. For example, in some embodiments, the signature pre-fix value may include the entire current hash tree. In other embodiments, a subset of the tree may be included. Returning to the example in FIG. 3, in some embodiments, the signature pre-fix value may, instead of $H_{i,1}$ for i=0 to r−1, have included $H_{0,1}$, $H_{0,2}$, $H_{0,3}$, and $H_{2,1}$, . . . , and $H_{r-1,1}$. Note that in such an embodiment, although $H_{1,1}$ is not included in the signature pre-fix value, its value could be derived from the values included in the signature pre-fix value because $H(H_{0,2}, H_{0,3})=H_{1,1}$. In some embodiments, the signature pre-fix value may further include additional information that may be used to determine how the authentication path should be verified. For example, the additional information may include information regarding the position of the public key $PK^{m-1}$, information regarding the position of the respective nodes included in the authentication path, or both. The additional information may be used, for example, to determine the order in which values should be concatenated to complete the hash tree from $PK^{m-1}$ to $PK^m$. As noted above, respective nodes included in the authentication path may be combined using various techniques (e.g., concatenating, interleaving).

Returning to the process 400 of FIG. 4, the signature pre-fix value $SIG^{m-1}$ may be generated, and associated with the current Merkle tree having a public key $PK^{m-1}$. The system may generate 410 a private key from the set of signing key pairs and a public key using the root node value of the generated hash tree. As an example, 31 key pairs {$sk_i$, $pk_i$} for i=1, . . . , 31 may be generated (e.g., one key pair for each daily backup for a full month) and, including the previous month's public key $PK^{m-1}$, a Merkle tree of size 32 may be created. The private key $SK^m$ may be {$sk_i$} for i=1, . . . , 31 and the public key $PK^m$ may be the value of the root node of the generated Merkle tree.

Finally, the system may make available 412 the public key $PK^m$, and the signature pre-fix value $SIG^{m-1}$. The key and signature pre-fix value may be made available directly (e.g., as part of a response to an API request) or provided implicitly (e.g., a reference is provided such that the reference may be used to obtain the key and signature pre-fix value from another source, such as a URL address or Uniform Resource Identifier (URI)).

As an example, a process for expanding the signing capacity of a hash tree described above in accordance with FIG. 4 may be performed as follows:

1. Generate $2^r-1$ one-time signature key pairs {$sk_i$, $pk_i$} for i=1 to $2^r-1$ where r is the height of the hash tree to generate;
2. Set $pk_0$ to $PK^{m-1}$, the current public key;
3. Set $t=2^r-1$;
4. For j=1 to r:
   a. For i=0 to t−1:
      i. Compute $H_{j,i}=H(H_{j-1,2i}, H_{j-1,2i+1})$;
      ii. t=t/2;
5. Compute secret key $SK^m$={$sk_i$} for i=1 to $2^r-1$;
6. Compute private key $PK^m=H_{r,0}$;
7. Compute signature pre-fix $SIG^{m-1}$={Hj,1} for j=0 to r−1; and
8. Update current key to $PK^m$.

Figure 5:
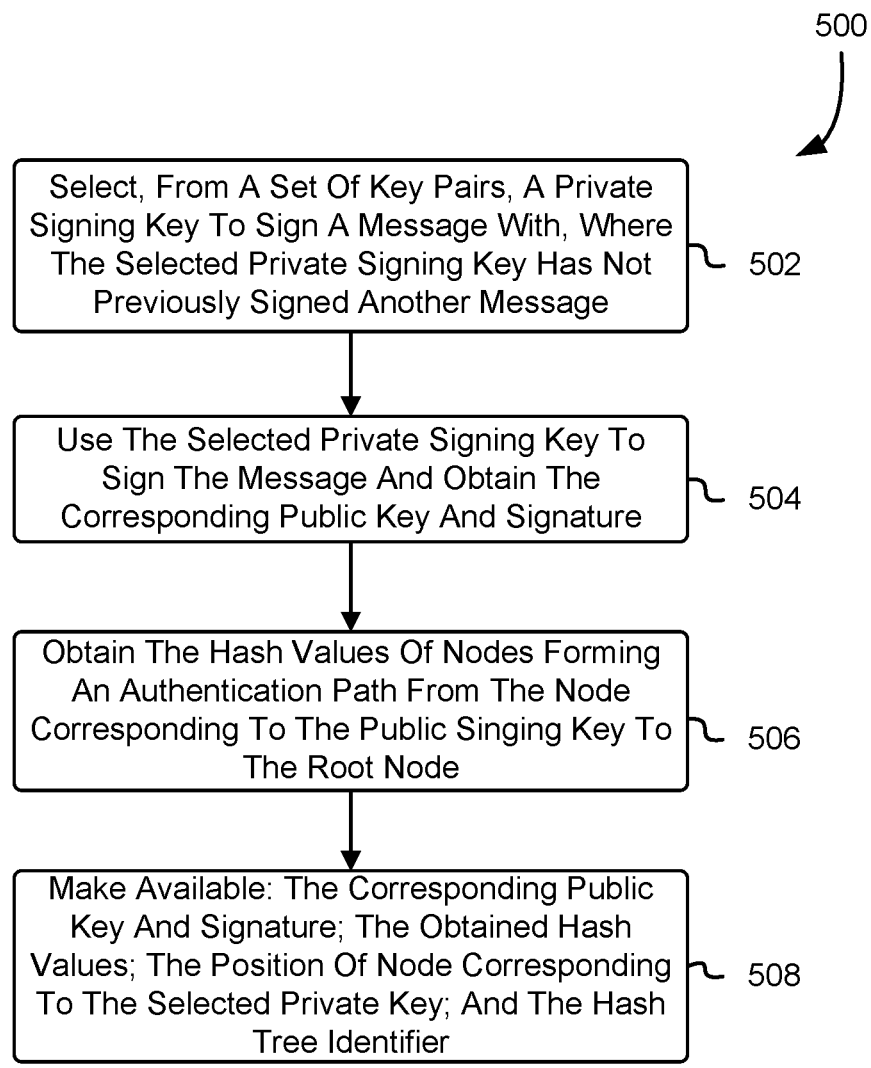
FIG. 5 shows a diagram illustrating the generation of a digital signature using a hash tree having expanded signing capabilities.

FIG. 5 shows an illustrative example of a process 500 for generating digital signatures that may be used in accordance with the expanded hash trees as described above in connection with FIG. 4. Generally, the process 500 may be performed by any suitable computing environment such as environments described above in connection with FIGS. 1-3.

In some embodiments, the system selects 502 from a set of key pairs a private signing key to sign a message with, where the selected private signing key $sk_j$ has not previously signed another message. The private signing key may be a signing key $sk_j$ that is generated, for example, in accordance with a process such as the key generation process described above in connection with FIG. 4. The key pair may be a one-time signature key pair such as a key pair in accordance with LD-OTS scheme or W-OTS scheme. In some embodiments, a system may maintain a counter j that is used to keep track of the number of key pairs in the signature scheme that have been used to sign messages. In some embodiments, the system may keep a counter j that keeps track of how many keys have been used to digitally sign messages. If j exceeds the number of key pairs in the system, then the process 400 may fail to generate a digital signature. For example, if the height of a binary tree is r and one leaf node corresponds to a previous public key, then the system may have $2^r-1$ signing key pairs and may not sign more than $2^r-1$ different messages. When a key pair is used to sign a message, the counter j may be incremented.

The system may use 504 the selected private signing key to sign a provided message m and obtain the corresponding public signing key $pk_j$ and digital signature $sig_j$ generated by the signing process over the message m. The signature algorithm may be in accordance with various one-time signature schemes such as LD-OTS scheme and W-OTS scheme.

The system may then obtain 506 the hash values of nodes forming an authentication path from the public signing $pk_j$ to the root node $PK^m$. In other words, the authentication path may include information that, in conjunction with the public signing key $pk_j$, may be used to derive the root node $PK^m$. In some embodiments, additional information may be obtained that may be used to determine how the authentication path should be verified. For example, the additional information may include information regarding the position of the public key $pk_j$, information regarding the position of the respective nodes included in the authentication path, or both. The additional information may be used, for example, to determine the order in which values should be concatenated to verify the authentication path. For example, the information may be used to determine whether a verification process should generate a hash $H(pk_j, H_{0,t_j})$ or $H(H_{0,t_j}, pk_j)$ as part of verifying the authentication path. The additional information may, for example, include the position of the public signing key $pk_j$ in the Merkle tree.

Finally, the system may make available 508: the signature $sig_j$; the public key $pk_j$; the collected nodes $\{H_{i,t_j}\}$ that may be used to verify an authentication path from the public signing key $pk_j$ to the root node of the hash tree $PK^m$; the counter j; and the hash tree identifier m. These outputs may be made available directly (e.g., as part of a response to an API request) or provided implicitly (e.g., a reference is provided such that the reference may be used to obtain the outputs from another source, such as a URL address or URI).

As an example, a process for generating digital signatures using an expanded hash tree described above in accordance with FIG. 5 may be performed as follows:

1. Obtain state information for current hash tree m and current counter j;
2. Verify $j<2^r$;
3. Generate a digital signature $sig_j$ over a message m using a private signing key $sk_j$;
4. Collect nodes $\{H_{i,t_j}\}$ for i=0 to r-1 forming an authentication path from $pk_j$ to $PK^m$;
5. Form a signature SIG including: $sig_j$; $pk_j$; the collected nodes $\{H_{i,t_j}\}$ forming the authentication path from $pk_j$ to $PK^m$; the counter j; and the hash tree identifier m; and
6. Increment j.

Figure 6:
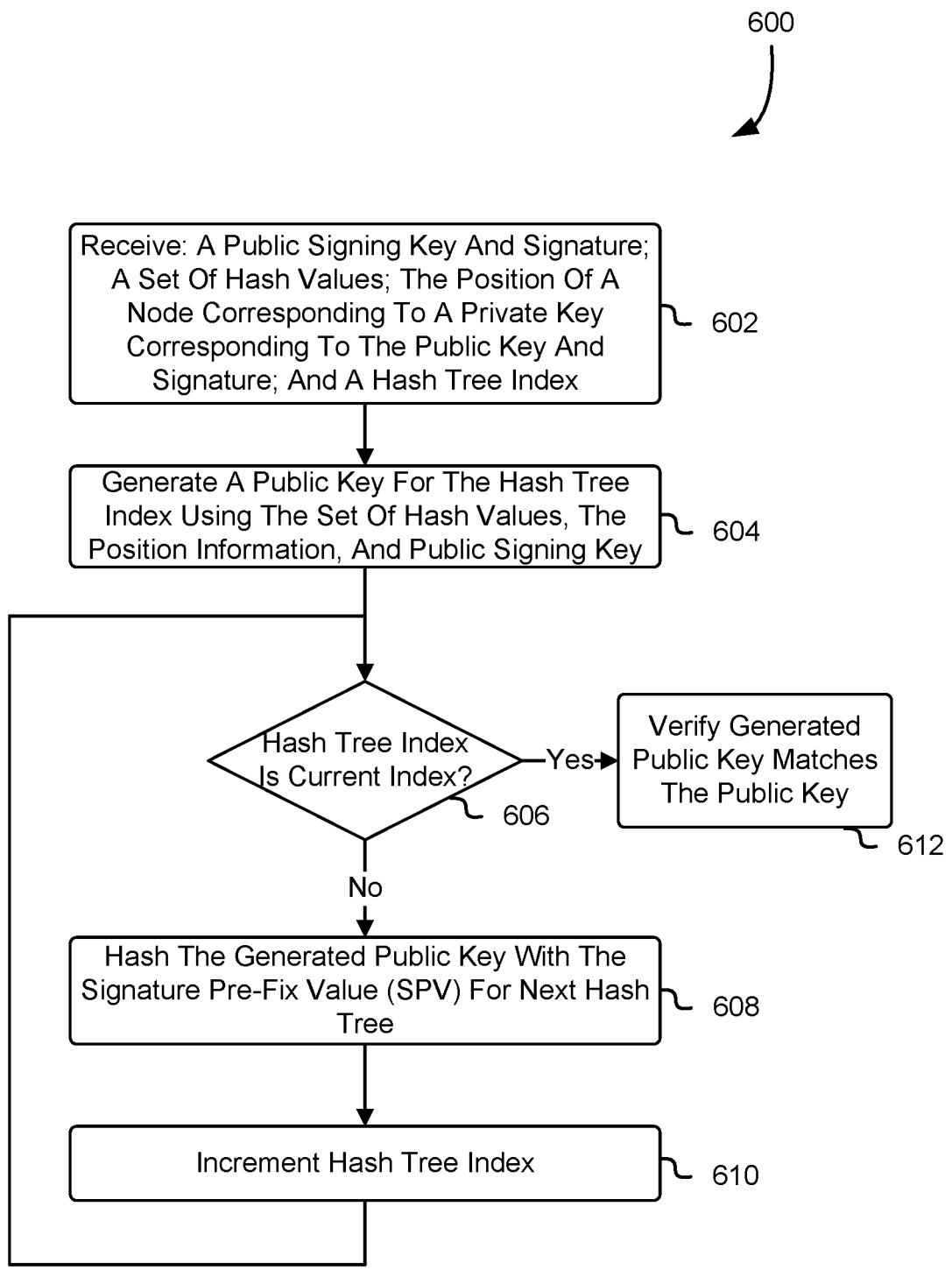
FIG. 6 shows a diagram illustrating the verification of a digital signature generated using a hash tree having expanded signing capabilities.

FIG. 6 shows an illustrative example of a process 600 for verifying digital signatures that may have been generated in accordance with the expanded hash trees as described above in connection with FIGS. 3-4. Generally, the process 600 may be performed by any suitable computing environment such as environments described above in connection with FIGS. 1-3.

A system performing the signature verification process 600 may have access to an authentic public key $PK^m$ that may be obtained from a digital certificate issued by a trusted certificate authority. In other embodiments, the public key $PK^m$ may be accessible to the system via a cryptography service that may be used to fulfill requests to perform cryptographic operations and may be backed by one or more cryptographic modules such as a hardware security module. Furthermore the system may have access to signature pre-fix values $\{SIG^u\}$ for one or more sub-trees under the current hash tree in cases where m>1. In the case where m=0, signature pre-fix values may not exist.

The system my receive 602, for example, as part of a request to verify a digital signature, a signature SIG, a message m, and an authentic public key $PK^m$. The signature SIG may be parsed to obtain: $sig_j$; $pk_j$; collected nodes $\{H_{i,t_j}\}$ forming the authentication path; tree position index j; and a hash tree identifier u. The message m may be the message for which signature verification may be performed against. The authentic public key $PK^m$ may be the single point of trust for the expanded hash tree, and may be obtained from various trusted sources as described above. For example, the system may request, from a certificate authority, a digital certificate containing the public key $PK^m$ where the digital certificate is signed by the certificate authority, is unexpired, and has an attestation from the certificate authority regarding the authenticity of the public key contained in the digital certificate. In some embodiments, the public key may be obtained from a centralized authority and/or a decentralized authority. For example, the system may obtain a digital certificate including the public key signed by a centralized authority such as a certificate authority. As a second example, the system may use a decentralized trust model based on a web of trust. A web of trust may refer to a decentralized security model in which multiple entities participating in communications in a network authenticate the identity of other entities.

The system may, after successfully parsing the signature SIG, generate 604 a public key $PK^u$ for the hash tree index using the provided public signing key $pk_j$, the collected nodes $\{H_{i,t_j}\}$ forming the authentication path, and the tree position index j. The index j may be used to determine how to generate the authentication path hashes. As an example, the index may be used to determine whether to calculate the hash $H(pk_j, H_{0,t_j})$ or $H(H_{0,t_j}, pk_j)$ as part of verifying the authentication path—in other words, whether to prepend or append $pk_j$ to the collected node values to form a hash function input. Hash outputs may be computed for the collected nodes in a nested manner. The output of the hash functions may refer to $PK^u$ which may have previously been the root node of the Merkle tree, but the tree has expanded such that u<m and $PK^m$ is now the root node of the Merkle tree.

In some embodiments, the system will determine whether 606 the hash tree index u of the provided signature refers to the current tree—that is, if u equals m, then the verification may be performed by verifying 612 the generated value $PK^u$ with the authentic public key $PK^m$ that may have been obtained from a certificate authority. In other embodiments, the authentic public key may be obtained from a decentralized authority, for example, through a web of trust.

However, in cases where the tree identifier u does not match the current tree, the generated hash value $PK^u$ may be hashed 608 with the signature pre-fix value for the next hash tree $SIG^u$. The signature pre-fix values may be generated and stored in accordance with embodiments described above in connection with FIG. 3. In the case where hash trees are expanded with the current tree root node as the leftmost node (e.g., in accordance with embodiments described in connection with FIGS. 1-3), the signature pre-fix value $SIG^u$ may include $\{H_{j,1}\}$ for j=0 to r−1 where r is the height of the u-th hash tree. Hashes may be iteratively generated by concatenating $PK^u$ and the first hash of $SIG^u$ $H_{0,1}$ and generating a hash over the concatenation. The output of the hash is then concatenated with the next hash of $H_{1,1}$ of the signature pre-fix value $SIG^u$ and a second hash is generated over the second concatenation. As noted above, a node may be generated by combined one or more other nodes using various techniques (e.g., concatenating, interleaving). The process 600 may include a step to increment 610 hash tree index u. The process can be iteratively performed to generate a hash value $PK'^{u+1}$. If u+1<m, then the process may be repeated where the hash value $PK'^{u+1}$ may be hashed with the signature pre-fix value for the next hash tree $SIG^{u+1}$ until the final hash value $PK'^m$ is generated. In this way, an authentication path may be generated from $PK^u$ to $PK'^m$. Upon generating the final value $PK'^m$, the system may verify 612 the generated hash value $PK'^u$ matches the value of the authentic public key $PK^m$. If the values match, then the provided signature SIG may be verified as being authentic. In some embodiments, the authentic public key $PK^m$ may be obtained from a certificate authority.

As an example, a process for verifying digital signatures generated using an expanded hash tree described above in accordance with FIG. 6 may be performed as follows:

1. Obtain a signature SIG, a message m, and an authentic public key $PK^m$;
2. Parse a provided signature SIG and obtain: $sig_j$; $pk_j$; collected nodes $\{H_{i,t_j}\}$ forming the authentication path; a counter j; and a hash tree identifier u;
3. Verify the signature $sig_j$ on the message m with the public key $pk_j$;
4. Set h'=H($pk_j$);
5. For i=0 to r, where r is the height of the u-th hash tree:
   a. Determine the order to hash h' and $H_{i,t_j}$;
   b. If determined to prepend h': compute h'=H(h', $H_{i,t_j}$);
   c. Else: compute h'=H($H_{i,t_j}$, h');
6. Set $PK^u$=h';
7. If u<m:
   a. For k=u to m−1:
      i. Set $PK'^{u+1}$=$PK^u$;
      ii. For j=0 to r−1:
         1. Compute $PK'^{u+1}$=H($PK'^{u+1}$, $H_{j,1}$) where $H_{j,1}$ comes from the signature pre-fix value $SIG^k$;
8. Else: verify $PK'^m$ matches $PK^m$.

It should be noted that for the purposes of this document, the calendar described is in accordance with a Gregorian calendar, but the same principles apply to various other calendaring systems. For example, lunar and lunisolar calendars generally have at most 30 days in a month and techniques described herein regarding generating a Merkle tree for each month of a Gregorian calendar may also be applied as the generation of Merkle trees having $2^5$=32 leaf nodes has a sufficient number of leaf nodes to accommodate each day of the month and a leaf node for the public key of at least one previous month. In some embodiments, two leaf node of a month's Merkle tree may be associated with the previous two months where one of the two months is a leap month.

It should be noted that the phrase "one-way function" includes functions that are not necessarily one-way in the strict mathematical sense, but that exhibit properties (such as collision resistance, preimage resistance and second preimage resistance) that render the function useful in contexts in which the various techniques of the present disclosure are applied. In this manner, an entity with output of the function but without access to the corresponding input, is unable to determine the input without, for instance, extraordinary expenditure of computational resources necessary for a cryptographic (e.g., brute force) attack. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (with the password being based at least in part on the plaintext and the cryptographic key, e.g.) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of preimage resistance (given a value y, the probability of randomly generating an input x such that f(x)=y is below a specified threshold), second preimage resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). The exact threshold for each probability may be context-dependent, with lower probabilities corresponding to higher security contexts. Hash functions usable as one-way functions in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference. One-way functions may include, but are not limited to, cryptographic functions that accept at least a plaintext and a cryptographic key as inputs and generate at least a ciphertext as an output (e.g., an encryption function). The output may be such that an entity with the output of the cryptographic operation is unable, without access to particular secret information, determine the input without performing an extraordinary expenditure of computing resources. For example, a one-way function may include an RSA encryption function such that the RSA encryption function accepts as inputs a plaintext and a public key and generates a ciphertext output that an entity without the corresponding private key is unable to solve in a feasible manner. While the input may be determinable to an entity without the private key through performing an integer factorization (e.g., a prime factorization), no known algorithm exists to solve the integer factorization problem in polynomial time using conventional computer systems. A one-way function may be used to perform a cryptographic derivation such that an input to the one-way function may be used to cryptographically derive an output in a manner that an entity without access to the corresponding input may not be able to determine the input without extraordinary expenditure of computational resources. An extraordinary expenditure of computational resources may refer to using computational resources to perform a computation whose run time complexity is not known to have an upper bound that can be represented by a polynomial expression.

Figure 7:
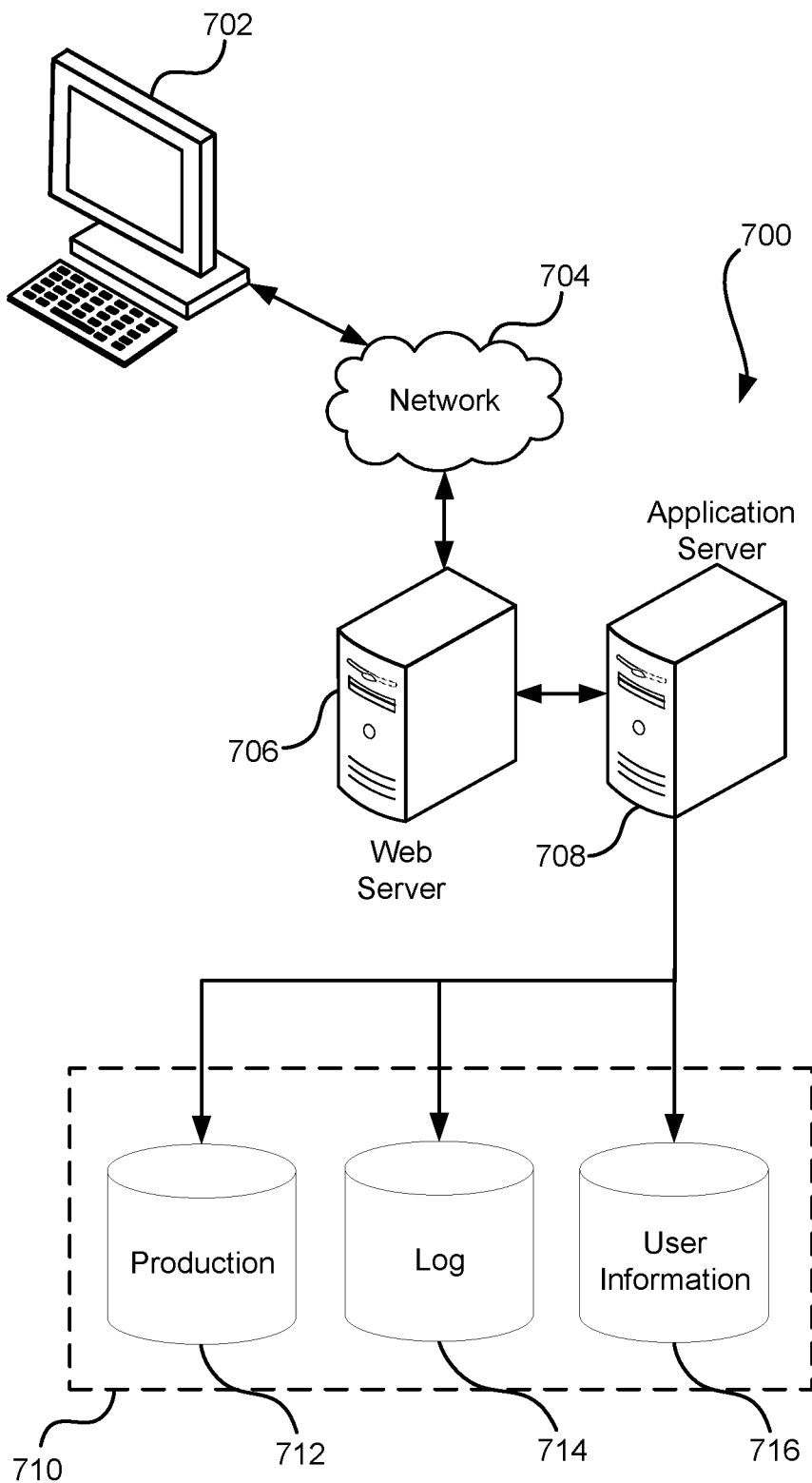
FIG. 7 illustrates an environment in which various embodiments can be implemented.

FIG. 7 illustrates aspects of an example environment 700 for implementing aspects in accordance with various embodiments. As will be appreciated, although a web-based environment is used for purposes of explanation, different environments may be used, as appropriate, to implement various embodiments. The environment includes an electronic client device 702, which can include any appropriate device operable to send and/or receive requests, messages, or information over an appropriate network 704 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment.

The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 702 and the application server 708, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 710 can include several separate data tables, databases, data documents, dynamic data storage schemes and/or other data storage mechanisms and media for storing data relating to a particular aspect of the present disclosure. For example, the data store illustrated may include mechanisms for storing production data 712 and user information 716, which can be used to serve content for the production side. The data store also is shown to include a mechanism for storing log data 714, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. The application server 708 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 702. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining, from a client computer system, a signature verification request comprising:
   a message;
   a digital signature;
   a signing key of a first plurality of signing keys, wherein the first plurality of signing keys are used to compute a first Merkle tree with a first root value that corresponds to a first public key; and a first set of public signature verification information derived at least in part from the first plurality of signing keys;
verifying the digital signature using at least the message and the signing key;
verifying the first public key is derivable based at least in part on the signing key and the first set of public signature verification information;
verifying a second public key is derivable based at least in part on the first public key and a second set of public signature verification information derived at least in part from a second plurality of signing keys, wherein the second plurality of signing keys and the first public key are used to compute a second Merkle tree with a second root value that corresponds to the second public key; and
as a result of successfully deriving the second public key, providing an indication to the client computer system that the digital signature is authentic.

2. The computer-implemented method of claim 1, wherein the first set of public signature verification information comprises a plurality of hash values from different depths of the first Merkle tree.

3. The computer-implemented method of claim 1, wherein signing keys of the first plurality of signing keys are used to digitally sign messages on a periodic schedule.

4. The computer-implemented method of claim 1, further comprising:
verifying a third public key is derivable based at least in part on the second public key and a third set of public signature verification information derived at least in part from a third plurality of signing keys, wherein the third plurality of signing keys and the second public key are used to compute a third Merkle tree with a third root value that corresponds to the third public key; and
wherein the indication that the digital signature is authentic is provided as a result of successfully deriving the second public key and the third public key.

5. A system, comprising one or more processors and memory storing instructions that, as a result of execution by the one or more processors, cause the system to:
obtain a request comprising:
a message;
a digital signature;
a signing key of a first plurality of signing keys; and
a first set of public signature verification information derived at least in part from the first plurality of signing keys;
verify the digital signature using at least the message and the signing key;
verify a first public key is derivable based at least in part on the signing key and the first set of public signature verification information;
verify a second public key is derivable based at least in part on the first public key and a second set of public signature verification information derived at least in part from a second plurality of signing keys; and
provide a response to the request indicating that the digital signature is authentic.

6. The system, of claim 5, wherein:
the first plurality of signing keys are used to compute a first Merkle tree with a first root value that corresponds to the first public key; and
the second plurality of signing keys and the first public key are used to compute a second Merkle tree with a second root value that corresponds to the second public key.

7. The system, of claim 6, wherein the first set of public signature verification information is a signature pre-fix value encoding a set of intermediate nodes of the first Merkle tree.

8. The system, of claim 6, wherein:
the first plurality of signing keys are leaf nodes of the first Merkle tree; and
the second plurality of signing keys and the first public key are leaf nodes of the second Merkle tree.

9. The system of claim 6, wherein the first public key corresponds to a predetermined leaf node position of the second Merkle tree.

10. The system of claim 5, wherein each signing key of the first plurality of signing keys is in accordance with a one-time signature scheme.

11. The system of claim 5, wherein the second plurality of signing keys are used to sign messages after exhaustion of the first plurality of signing keys.

12. The system of claim 5, wherein the instructions that cause the system to verify that the second public key is derivable based at least in part on the first public key and the second set of public signature verification information derived at least in part from the second plurality of signing keys include instructions that, as a result of execution by the one or more processors, cause the system to verify the second public key is derivable based further at least in part on a third public key, further wherein the third public key is derivable based at least in part on a third plurality of signing keys.

13. A non-transitory computer-readable storage medium storing executable instructions that, as a result of being executed by one or more processors of a computer system, cause the computer system to at least:
obtain, from a client computer system, a signature verification request comprising:
a message;
a digital signature;
a signing key of a first plurality of signing keys; and
a first set of public signature verification information derived at least in part from the first plurality of signing keys;
verify the digital signature using at least the message and the signing key;
verify a first public key is derivable based at least in part on the signing key and the first set of public signature verification information;
verify a second public key is derivable based at least in part on the first public key and a second set of public signature verification information derived at least in part from a second plurality of signing keys; and
provide an indication to the client computer system that the digital signature is authentic.

14. The non-transitory computer-readable storage medium of claim 13, wherein:
the first public key and the first plurality of signing keys form a first Merkle tree wherein a root node of the first Merkle tree corresponds to the first public key and leaf nodes of the first Merkle tree correspond to the first plurality of signing keys;
the first set of public signature verification information comprises a collection of nodes, wherein each node of the collection is a node of the first Merkle tree, and further wherein the first public key is derivable from the collection of nodes and the signing key; and
the first set of public signature verification information is used to further verify, based at least in part on the signing key and the message, that the digital signature is authentic.

15. The non-transitory computer-readable storage medium of claim 14, wherein the collection of nodes includes one node at each depth of the first Merkle tree below the root node of the first Merkle tree.

16. The non-transitory computer-readable storage medium of claim 14, wherein the first public key is derivable from the collection of nodes and the signing key based at least in part on performing a cryptographic hash function on a pre-image, wherein generation of the pre-image includes combining the signing key with a particular node value of the collection of nodes.

17. The non-transitory computer-readable storage medium of claim 14, wherein a public key corresponding to a private key of the first plurality of signing keys is generated based at least in part using a cryptographic hash function.

18. The non-transitory computer-readable storage medium of claim 14, wherein:
  the second public key, the first public key, and the second plurality of signing keys form a second Merkle tree wherein a second root node of the second Merkle tree corresponds to the second public key and leaf nodes of the second Merkle tree correspond to the first public key and the second plurality of signing keys; and
  the first Merkle tree and second Merkle tree share a same tree depth.

19. The non-transitory computer-readable storage medium of claim 13, wherein the second public key is obtained from a web of trust.

20. The non-transitory computer-readable storage medium of claim 13, wherein the second public key is obtained from a centralized authority.

\* \* \* \* \*